United States Patent
Richter et al.

[15] 3,643,546
[45] Feb. 22, 1972

[54] TUNED DAMPING MEANS FOR INCREASING THE MINIMUM DYNAMIC STIFFNESS OF A SPINDLE SYSTEM

[72] Inventors: Robert C. Richter, Cincinnati, Ohio; Shimoga K. Srinath, Seattle, Wash.

[73] Assignee: Cincinnati Milacron Inc., Cincinnati, Ohio

[22] Filed: Dec. 18, 1969

[21] Appl. No.: 886,063

[52] U.S. Cl. ............................ 90/11 A, 279/1 R, 408/143
[51] Int. Cl. ............................... B23c 9/00, B23b 47/00
[58] Field of Search .................. 90/11 A; 77/58 B; 51/168; 279/1 R, 2, 103

[56] References Cited

UNITED STATES PATENTS

| | | | |
|---|---|---|---|
| 2,051,954 | 8/1936 | Leland | 77/58 B |
| 2,436,466 | 2/1948 | Wilson | 51/168 |
| 3,463,048 | 8/1969 | Owsen | 90/11 A |
| 963,935 | 7/1910 | Parker | 90/11 A X |

*Primary Examiner*—Gil Weidenfeld
*Attorney*—Frank C. Leach, Jr.

[57] ABSTRACT

The minimum dynamic stiffness of a milling cutter and its holder, which form a spindle system, is increased by disposing a tuned damped vibration absorber, which comprises a damping mass supported by a viscoelastic material element, within the milling cutter. The element of viscoelastic material is retained within the damping mass by retaining means.

12 Claims, 5 Drawing Figures

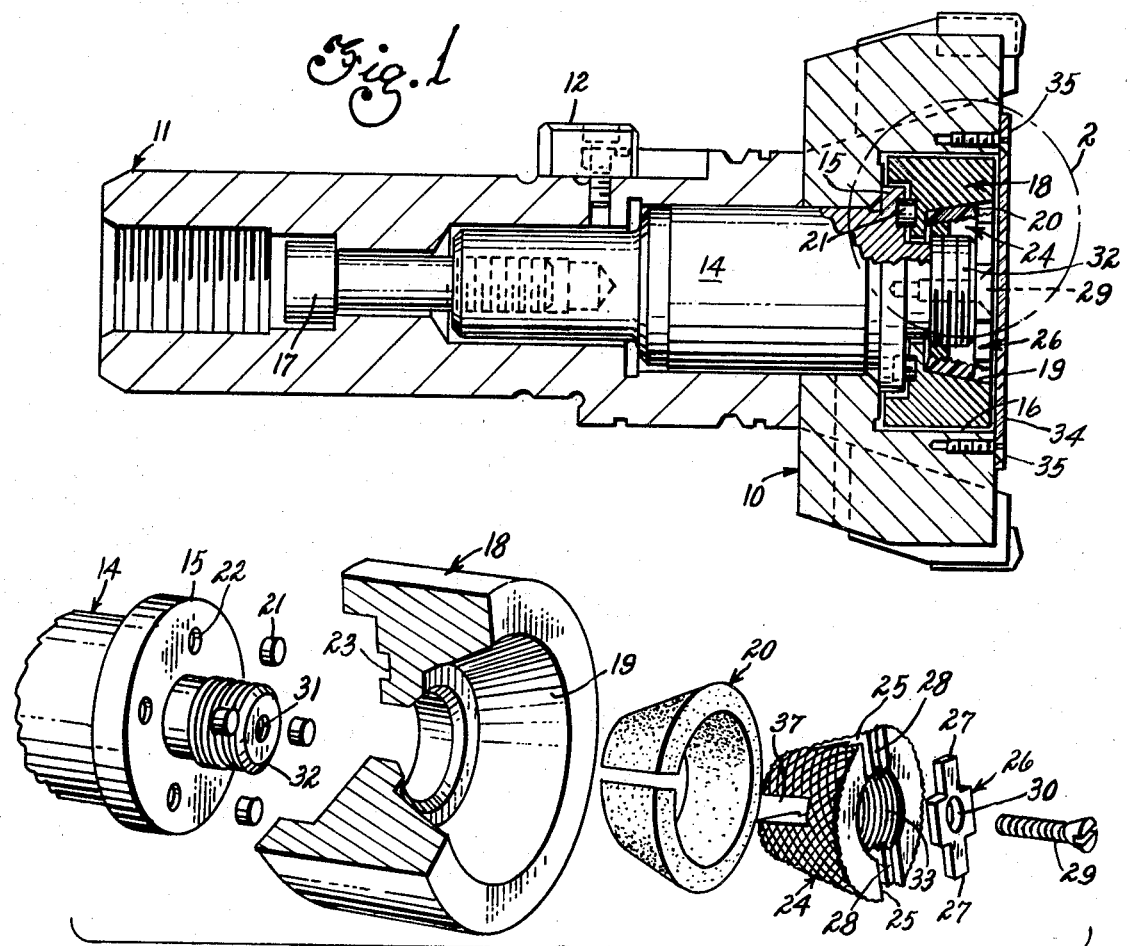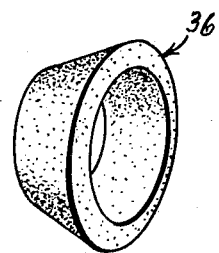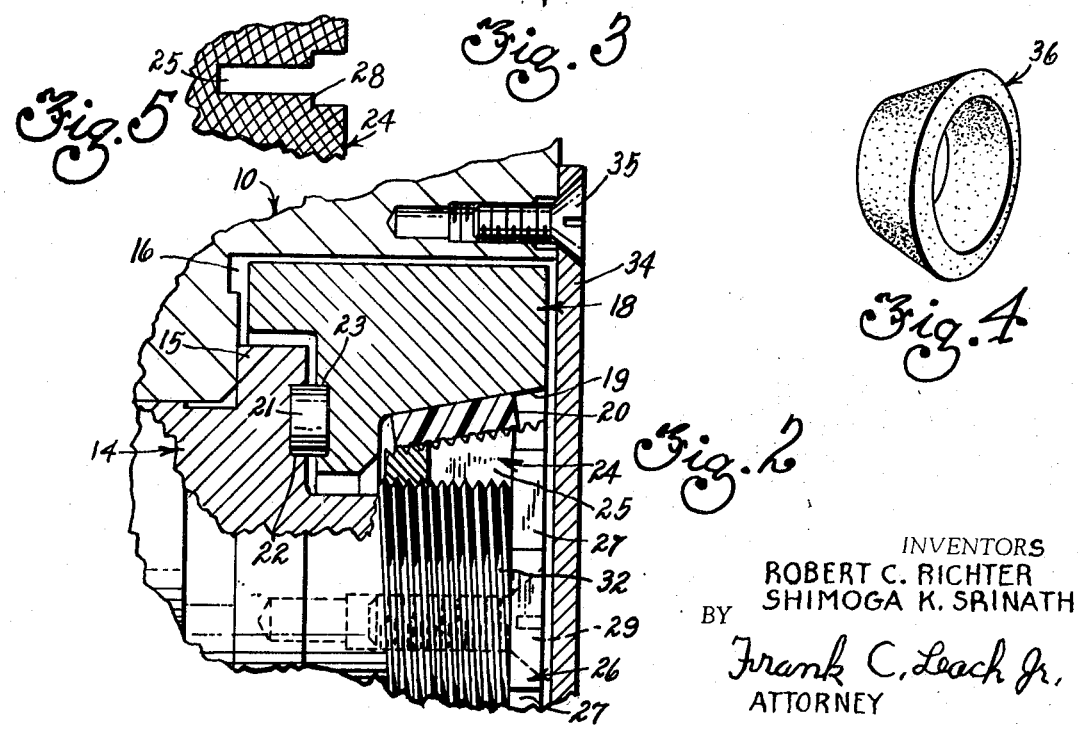
INVENTORS
ROBERT C. RICHTER
SHIMOGA K. SRINATH
BY
Frank C. Leach Jr.
ATTORNEY

TUNED DAMPING MEANS FOR INCREASING THE MINIMUM DYNAMIC STIFFNESS OF A SPINDLE SYSTEM

In machine tools such as a milling machine, for example, if the ratio of the cutting stiffness, which is the spring constant between the cutting element and the material being cut, to the minimum dynamic stiffness of the spindle system, which includes the milling cutter and its holder, is greater than one-half, regenerative chatter will occur to cause the cutter to vibrate. This results in the workpiece being unsatisfactory.

To avoid the regenerative chatter problem, the cutting stiffness is maintained at a sufficiently low value so that the ratio of the cutting stiffness to the minimum dynamic stiffness of the spindle system does not exceed one-half. However, to maintain the cutting stiffness at this low value, it is necessary to not obtain maximum effectiveness from the milling machine. That is, the depth of the cut, for example, must be much smaller than the cutter drive motor is capable of producing. By maintaining the cutting stiffness at the relatively low value, the milling machine is capable of producing a satisfactory product but the unit cost is relatively high because of the long period of time required due to the rather shallow cuts that are employed to avoid the problem of regenerative chatter.

The present invention satisfactorily solves the foregoing problem by utilizing a tuned damped absorber to increase the minimum dynamic stiffness of the spindle system. Accordingly, when the minimum dynamic stiffness of the spindle system is increased, the cutting stiffness may be increased without the ratio of the cutting stiffness to the minimum dynamic stiffness exceeding one-half. Therefore, by employing the damping means of the present invention, the unit cost for producing parts can be reduced since the increase in the cutting stiffness allows a deeper cut to be made in the material being cut.

The present invention employs a viscoelastic material and a damping mass to increase the minimum dynamic stiffness of the spindle system. In the present invention, the damping means is tuned to the frequency of the spindle system, and through properly selecting the mass of the damping mass and the spring constant of the viscoelastic material. The damping means is mounted in the milling cutter in order to be most effective to dampen the radial mode of vibration of the spindle system.

An object of this invention is to provide damping means to increase the minimum dynamic stiffness of a spindle system for a machine tool thereby allowing a higher cutting stiffness to exist without regenerative chatter.

Other objects of this invention will be readily perceived from the following description, claims, and drawing.

This invention relates to a tuned damped vibration absorber for a machine tool having cutting means including a rotating cutting element. The absorber includes an element of viscoelastic material supported within the rotating cutting element and providing the sole support for a damping mass. The damping mass and the element of viscoelastic material cooperate to absorb vibrations from the cutting means.

The attached drawing illustrates preferred embodiments of the invention, in which:

FIG. 1 is a longitudinal sectional view of a milling cutter and its holder;

FIG. 2 is an enlarged fragmentary sectional view of a portion of the milling cutter of FIG. 1 showing the details of the damping means of the present invention and taken within the circle indicated by 2 in FIG. 1;

FIG. 3 is an exploded perspective view of the damping means of the present invention and a portion of the element of the tool holder on which it is supported;

FIG. 4 is a perspective view of another form of the viscoelastic material of the damping means; and FIG. 5 is a fragmentary view of a portion of a tightening nut.

Referring to the drawing and particularly FIG. 1, there is shown a shell end milling cutter 10 mounted on a tool adapter or holder 11. The tool adapter or holder 11 is adapted to be inserted within a spindle (not shown) of a milling machine, either manually or by an automatic tool-changing apparatus, for rotation of the milling cutter 10 whenever the spindle is rotated. The tool holder 11 has a key 12 fixed thereto to provide the drive from the spindle through cooperation with a key slot in the spindle in the well-known manner.

The milling cutter 10 is retained on the holder 11 by a cutter fastener nut 14, which as a flange 15 bearing against a surface or wall of a recess 16 in the milling cutter 10. The cutter fastener nut 14 has its end, which is remote from the milling cutter 10, formed with a threaded passage to receive the end of a locking or retaining bolt 17 whereby the cutter fastener nut 14 is retained within the holder 11.

The damping means of the present invention includes an annular shaped damping mass 18, which is mounted within the recess 16 in the face of the milling cutter 10. The damping mass 18 has an inner conical surface 19 in its end, which is remote from the cutter fastener nut 14, to receive a conically shaped element 20 of a suitable viscoelastic material such as polyvinyl chloride, for example.

Depending on the size of the milling cutter 10 and the frequency to be damped by the tuned damped absorber of the present invention, it may be necessary to form the damping mass 18 of a material having a high specific weight to increase the damper mass. One suitable example of a material having a high specific weight is a high-density tungsten alloy such as that sold under the trademark Kennertium. This material has a specific weight of 0.66 pounds/in$^3$.

When preloaded at assembly, the conically shaped element 20 of viscoelastic material maintains an axial preload on buttons 21, which are disposed within equally angularly spaced openings 22 in the face of the flange 15 of the cutter fastener nut 14 and equally angularly spaced openings 23 in the support member 18, by virtue of the conical shape of the element 20. The buttons 21 are formed of a suitable viscoelastic material such as polyvinyl chloride, for example. The buttons 21 prevent spinning of the damping mass 18 when the milling spindle starts or stops. Without the buttons 21, the conically shaped element 20 would wear due to relative spinning of the damping mass 18 and the cutter holder 11 when the milling cutter 10 starts or stops.

The conically shaped element 20 is urged against the conical surface 19 of the damping mass 18 by an adjusting or tightening nut 24. The outer surface of the nut 24 is knurled to fit tightly against the conically shaped element 20.

The adjusting or tightening nut 24 is formed with a first pair of diametrically disposed slits 25 and a second pair of diametrically disposed slits 37. The slits 25 and 37 are formed in the nut 24 to eliminate hoop stresses therein. The slits 25 also receive an assembly tool to position the nut 24.

A retaining member 26 has opposite legs 27 disposed with in the slits 25 and resting on surfaces 28 in the nut 24. The surfaces 28 are formed in the nut 24 at the open ends of the slits 25 to provide a larger area than the remainder of the width of each of the slits 25. Each of the legs 27 of the retaining member 26 is wider than the remainder of the width of the slits 25.

The retaining member 26 has a screw 29 extending through an opening 30 therein. The screw 29 is threaded into a threaded bore 31 in a projecting portion 32 of the cutter fastener nut 14 whereby the screw 20 retains the adjusting or tightening nut 24 on the cutter fastener nut 14. Thus, the damping means is connected to the milling cutter 10.

The tightening nut 24 has its inner surface 33 threaded for cooperation with threads on the projecting portion 32 of the cutter fastener nut 14. This fixes the nut 24 to the cutter fastener nut 14.

The legs 27 of the retaining member 26 hold the adjusting or tightening nut 24 in the position to which it is adjusted or moved. Thus, the nut 24 cannot unscrew from the projecting portion 32 during operation.

The damping means is protected from chips by a cover plate 34, which is secured to the milling cutter 10 by screws 35. Thus, there is no possibility of the damping means being clogged due to the chips on the milling cutter 10, for example.

While the present invention has shown and described the conically shaped element 20 as being a strip having its ends separated, it should be understood that a conically shaped element 36, which is a single continuous element as shown in FIG. 4, could be employed. However, the element 36 is more expensive to form than the element 20.

While the element of viscoelastic material has been shown as being conically shaped, it should be understood that any desired shape could be employed. It is only necessary that the damping means include an element of a suitable viscoelastic material to absorb the vibrations of the spindle system and that it be used with sufficient damping mass whereby tuning of the damping means to the spindle system is obtained.

The mass of the damping mass 18 must be selected so that it cooperates with the viscoelastic material of the element 20 or 36 whereby the entire damping means can be tuned to the natural frequency of the spindle system at which the dynamic stiffness of the spindle system is a minimum. To fit within the recess 16 in the milling cutter 10, it may be necessary for the damping mass 18 to have a high specific weight.

Tests have been conducted on a milling cutter in which the damping means of the present invention was employed with the element 20 and on the same milling cutter without the damping means. The damping means enables the milling cutter to be capable of making a cut three times as deep as that when the milling cutter does not have the damping means of the present invention without causing regenerative chatter.

While the damping means of the present invention has been shown and described as being employed with the milling cutter 10, it should be understood that the damping means of the present invention may be utilized with any machine tool in which a rotating cutting element is subjected to vibrations. Thus, for example, the damping means of the present invention may be used with a grinding machine.

While the present invention has shown and described the element 20 or 36 of viscoelastic material as being disposed within the damping mass 18 to support the damping mass 18, it should be understood that the element 20 or 36 of viscoelastic material could be disposed in surrounding relation to the damping mass 18. It is only necessary that the element 20 or 36 of viscoelastic material provide the sole support for the damping mass 18.

An advantage of this invention is that the unit cost of machining a workpiece is reduced in comparison with the unit cost for the same machine not having the damping means of the present invention. Another advantage of this invention is that a machine tool may be operated at greater cutting speeds without any regenerative chatter.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A tuned damped vibration absorber for a machine tool having cutting means including a rotating cutting element, said absorber including:
   an element of viscoelastic material supported within the rotating cutting element;
   a damping mass supported solely by said element of viscoelastic material;
   said damping mass and said element of viscoelastic material cooperating to absorb vibrations from the cutting means;
   means to retain said damping mass and said element of viscoelastic material on the cutting means;
   said element of viscoelastic material having a conical shape;
   said damping mass having a conical surface to receive said conical-shaped element of viscoelastic material;
   and means to hold said element of viscoelastic material in engagement with the conical surface of said damping mass.

2. The vibration absorber according to claim 1 in which said element of viscoelastic material is a strip having its ends free.

3. The vibration absorber according to claim 1 in which said element of viscoelastic material is a continuous strip.

4. The vibration absorber according to claim 1 including means cooperating with said damping mass remote from the conical surface of said damping mass and with the cutting means to prevent said damping mass from spinning when the cutting means starts or stops, said cooperating means being a viscoelastic material.

5. A tuned damped vibration absorber for a machine tool having cutting means including a rotating cutting element, said absorber including:
   an element of viscoelastic material supported within the rotating cutting element;
   a damping mass supported solely by said element of viscoelastic material;
   said damping mass and said element of viscoelastic material cooperating to absorb vibrations from the cutting means;
   means to retain said damping mass and said element of viscoelastic material on the cutting means;
   and means to prevent said damping mass from spinning when the cutting means starts or stops, said preventing means comprising a plurality of elements of viscoelastic material disposed in recesses in both said damping mass and the cutting means.

6. The vibration absorber according to claim 1 in which said element of viscoelastic material is preloaded.

7. The vibration absorber according to claim 1 in which said damping mass partially surrounds said viscoelastic material.

8. The vibration absorber according to claim 5 in which said element of viscoelastic material preloads said elements of said preventing means.

9. The vibration absorber according to claim 8 in which said element of viscoelastic material has a conical shape.

10. The vibration absorber according to claim 5 in which said element of viscoelastic material is preloaded.

11. The vibration absorber according to claim 5 in which said element of viscoelastic material is a strip having its ends free.

12. The vibration absorber according to claim 5 in which said element of viscoelastic material is a continuous strip.

* * * * *